Aug. 8, 1950
W. H. STRACENER ET AL
2,518,198
SHOCK MOUNT FOR ELECTRIC REGULATORS
Filed Nov. 22, 1948
FIG. 1
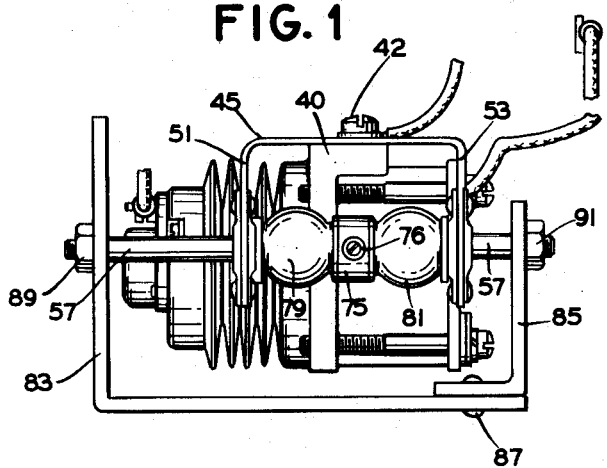
FIG. 2
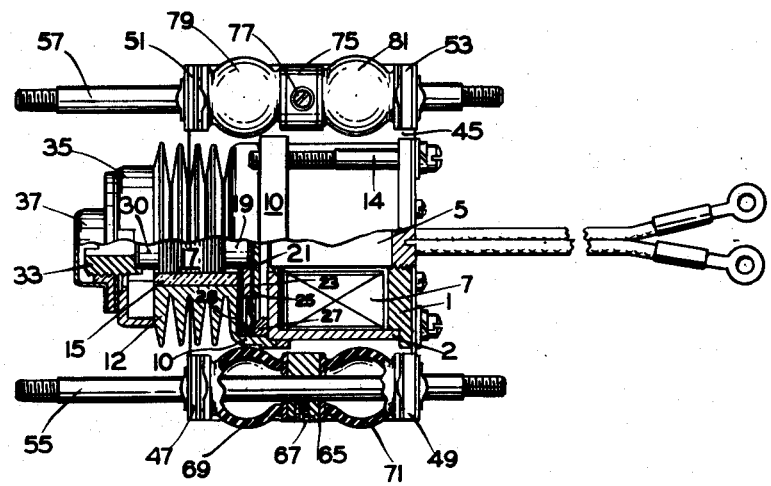
FIG. 3
INVENTORS
*WILLIAM H. STRACENER*
*PAUL F. BECHBERGER*
BY *Herbert L...*
ATTORNEY Patented Aug. 8, 1950

2,518,198

UNITED STATES PATENT OFFICE 2,518,198

SHOCK MOUNT FOR ELECTRIC REGULATORS

William H. Stracener, Teaneck, and Paul F. Bechberger, Tenafly, N. J., assignors to Bendix Aviation Corporation, Teterboro, N. J., a corporation of Delaware Application November 22, 1948, Serial No. 61,342

7 Claims. (Cl. 248—358)

The present application relates to an improved shock mount for a carbon pile regulator.

Heretofore two point inverted pendulous type shock mounts have been used for mounting a carbon pile regulator. This type of shock mount has been found to be inherently unstable, since it is below and aft the center of gravity of the carbon pile and caused severe modulation of the regulated output voltage when the amplitude of vibration of the carbon was increased.

Numerous trials disclosed that high amplitude vibration, either vertical or horizontal, transverse to the pile axis, caused slight, but not objectionable modulation of the regulated output voltage. However, vibration along the axis of the pile caused excessive modulation of the regulated voltage.

In order to avoid the latter conditions, a novel type of shock mount was conceived wherein the carbon pile is mounted rigidly along axes transverse (vertically and horizontally) to the pile axis, but with relative freedom along the axis of the carbon pile. This mount was along a plane through the center of gravity of the carbon pile regulator and its support so that the carbon pile remains substantially unaffected under varying vibratory conditions.

An object of the invention, therefore, is to provide a novel shock mount for a carbon pile regulator wherein the pile is mounted rigidly along axes transverse (vertically and horizontally) to the pile axis, but with relative freedom along the axis of the pile.

The above and other objects and features of the invention will appear more fully hereinafter from a consideration of the following description taken in connection with the accompanying drawing wherein one embodiment of the invention is illustrated by way of example.

In the drawing:

Figure 1 is a side elevational view of a novel shock mount in assembled relation with a carbon pile regulator and mounting bracket.

Figure 2 is a top plan view of the regulator and shock mount of Figure 1 with certain parts broken away to better illustrate the invention.

Figure 3 is an enlarged detail sectional view of one of the novel O ring mountings of the invention.

Referring to the drawing of Figure 2, there is shown a carbon pile regulator of the so-called "diaphragm spring" type such as disclosed and claimed in the copending application Serial No. 612,691, filed August 25, 1945 by William G. Neild, now Patent No. 2,481,771, issued September 13, 1949, and assigned to the assignee of the present application.

There is provided in the latter regulator a bottom plate 1 on which is mounted a casing 2. The bottom plate 1 and casing 2 are formed of a suitable ferro-magnetic material. A core 5 of similar material projects from the bottom plate 1 into an electromagnetic winding 7 wound about the core 5 and positioned in the casing 2. Positioned on the casing 2 is an annular flange member 10 of a housing 12 which is fastened to the bottom plate 1 by suitable screws 14, one of which is shown in the drawing.

The housing 12 may be of a type such as shown in U. S. Patent No. 2,427,805, granted September 23, 1947 to William G. Neild and assigned to Bendix Aviation Corporation.

Mounted within the housing 12 is a non-conducting tube 15 of a suitable refractory material such as porcelain or glass. The tubular member 15 carries carbon discs 17 to form a carbon pile. A contactor member 19 is positioned between one end of the carbon pile 17 and an armature plate 21. The contactor member is positioned in a ring-shaped securing member 23 mounted on the armature plate 21. The armature plate 21, as shown in Figure 2, is positioned at one side of a diaphragm type spring 25 which is clamped between the armature plate 21 and the ring member 23. An annular edge portion of the diaphragm type spring 25 is clamped to a ring member 27 as set forth in the aforenoted copending application Serial No. 612,691, filed August 25, 1945 by William G. Neild, now Patent No. 2,481,771, issued September 13, 1949, and assigned to the assignee of the present application.

It is notable that the annular edge of the diaphragm 25 is fixedly mounted in the annular ring 27 and extends across the ring 27 suspending the armature 21 therein. An axial movement of the armature 21 is accommodated by suitable kinks or corrugations formed in the diaphragm 25.

It has been found that by providing the diaphragm 25 of suitable material and thickness and the corrugations of proper depth, basic correspondence with the varying pull of the magnet 7 may be effected. A wave washer 28 or other suitable means may be provided to bias the ring 27 toward casing 2 to prevent rotation or shift of position of the annular ring 27 from the effects of vibration.

At the opposite end of the carbon pile 17 there is provided a second contactor 30 which may be suitably adjusted by a screw member 33 positioned in a cap 35 fastened to the housing 12. A removable cover 37 is arranged to prevent accidental adjustment of the screw 33.

The foregoing structure of the carbon pile regulator is claimed and disclosed in greater detail in the copending U. S. application Serial No. 612,691, filed August 25, 1945 by William G. Neild, now Patent No. 2,481,771, issued September 13, 1949, and assigned to the assignee of the present application.

The subject matter of the present invention is directed to a novel type of shock mount for such a regulator wherein the carbon pile regulator assembly is mounted rigidly along the axes transverse (vertically and horizontally) to the pile axis, but with relative freedom along the axis of the pile 17. This novel shock mount is along a plane through the center of gravity of the carbon pile regulator and its support 40.

Its support 40, as shown in Figure 1, projects from the base of the carbon pile regulator and is fastened by suitable screws 42 to a mounting plate 45 having projecting ear portions 47 and 49, as shown in Figure 2, which extend in parallel spaced relation at one side of the regulator.

Similar ear portions 51 and 53 extend from the base plate 45 at the opposite side of the regulator, as shown in Figures 1 and 2.

Projecting through the ear portions 47 and 49 is a polished rod 55. Similarly projecting through the ear portions 51 and 53 is a polished rod 57. The rods 55 and 57 are carried in the ear portions 47 and 49, and 51 and 53, respectively, by suitable O-rings formed of a resilient rubber-like plastic, one of which is shown in Figure 2 and indicated by numeral 59. The O-ring 59 is positioned in the ear portion 47 and is held in place by suitable end plates 61 and 63 slightly spaced from rod 55 and permitting a more or less degree of rolling action between the O-ring 59 and the rod 55. The rolling action occurs upon initial movement of the supporting ears 47 and 49 and regulator assembly relative to rod 55 followed thereafter by a sliding action.

Corresponding end plates and O-ring mounting are provided for each of the ears 49, 51, and 53 supporting the polished rods 55 and 57. The polished rods 55 and 57 are lubricated by a suitable grease or oil. A mid-point stop ring 65 is affixed to the polished rod 55 by suitable set screws at adjacent quadrants, one of which is indicated at 67. Two bulbous rubber snubbers 69 and 71 are mounted at either side of the stop ring 65 on the rod 55 and between the ear portions 47 and 49, respectively, so as to limit the travel of the ears 47 and 49 on the rod 55 and to introduce damping into the assembly.

A similar mid-point stop ring 75 is affixed to the polished rod 57 by set screws 76 and 77 at adjacent quadrants. Like bulbous rubber snubbers 79 and 81 are mounted at either side of the stop ring 75 on the rod 57 and between the ears 51 and 53, respectively, to cooperate in limiting the travel of the ears 51 and 53 and also to introduce damping into the assembly. The rods 55 and 57, as shown in Figure 1, are mounted between a suitable base assembly including a mounting plate 83 and a projecting flange 85 fastened by suitable rivets 87. The rods are fastened in the latter mounting assembly by suitable nuts, two of which are indicated in Figure 1 by the numerals 89 and 91.

It will be seen from the foregoing that while the regulator assembly is substantially rigidly mounted along axes transverse (vertically and horizontally) to the pile axis, the mounting plate 45, and respective rods 55 and 57, permit relative freedom of movement of the regulator along the axis of the pile 17 so as to reduce the effects of vibration upon the regulator and along the axis of the carbon pile 17.

Although only one embodiment of the invention has been illustrated and described, various changes in the form and relative arrangements of the parts may be made to suit requirements.

What is claimed is:

1. For use with a mechanism including a casing and variable resistance carbon pile discs adjustably mounted in said casing; a shock mount assembly for said casing, comprising, in combination, a mounting plate affixed to said casing and extending transverse the axis of said carbon pile, a first pair of ear portions projecting from one end of the mounting plate in spaced relation, a second pair of ear portions projecting from the other end of the mounting plate in spaced relation, a first rod slidably associated with and extending through said first pair of ear portions in parallel relation to the axis of said carbon pile, a second rod slidably associated with and extending through said second pair of ear portions in parallel relation to the axis of said carbon pile and at the opposite side thereof, a mid-point stop ring affixed to each of said rods intermediate the opposite ends thereof and between the associated ear portions, a pair of bulbous rubber snubbers positioned on each of said rods, one of said bulbous rubber snubbers between each of the ear portions and the mid-point stop ring of the associated rod so as to limit the travel of the ear portions on the rod associated therewith and to introduce damping into the shock mount assembly.

2. The combination defined by claim 1 including resilient rubber-like plastic ring members to support each ear portion on its associated rod and each ring member effecting a rolling sliding movement relative to its associated rod upon vibratory movement of the mechanism casing along the axis of said carbon pile.

3. A shock mount for a carbon pile regulator assembly, comprising means to rigidly mount the assembly along axes transverse the pile axis, and other means to resiliently support the regulator assembly along the axis of the carbon pile.

4. The combination defined by claim 3 in which said other means includes a pair of rods extending parallel to the axis of the pile and slidably mounting the assembly with relative freedom along the axis of the carbon pile, and resilient means opposing movement of said assembly on said rods.

5. The combination defined by claim 3 in which said other means includes a pair of rods extending parallel to the axis of the pile and slidably mounting the assembly with relative freedom along the axis of the carbon pile, and bulbous rubber snubbers affixed to each of said rods and resiliently opposing movement of said assembly on said rods.

6. The combination defined by claim 3 in which said mounting means includes resilient ring members to permit vibratory movement of the regulator assembly along the axis of the carbon pile.

7. A shock mount for a carbon pile regulator assembly, comprising a pair of rods extending parallel to the axis of the pile, resilient ring members cooperating with said rods so as to slidably mount the assembly with relative freedom along the axis of the carbon pile, a pair of bulbous rubber snubbers positioned on each of said rods, a mid-point stop ring affixed to said rod and limiting movement of said bulbous rubber snubbers with relation to the associated rod, and said bulbous rubber snubbers resiliently opposing movement of said assembly along said rods.

WILLIAM H. STRACENER.
PAUL F. BECHBERGER.

No references cited.